United States Patent [19]
Gerber

[11] Patent Number: 4,888,941
[45] Date of Patent: Dec. 26, 1989

[54] FRUIT HARVESTING MACHINE

[76] Inventor: Curtis E. Gerber, 4015-8C Bayshore Blvd., Tampa, Fla. 33611

[21] Appl. No.: 306,080

[22] Filed: Feb. 6, 1989

[51] Int. Cl.⁴ .................... A01D 46/00; E04G 1/20
[52] U.S. Cl. ........................... 56/328.1; 182/2
[58] Field of Search ............... 56/149, 15.5, 328.1, 56/329; 182/2,148, 63, 141; 193/7, 15, 25 C

[56] References Cited

U.S. PATENT DOCUMENTS

| | | |
|---|---|---|
| 2,450,152 | 9/1948 | Miller . |
| 2,798,623 | 7/1957 | Girardi .................................. 182/2 |
| 2,821,312 | 1/1958 | Wiegel .................................. 182/2 |
| 2,927,705 | 3/1960 | Girardi .................................. 182/2 |
| 2,973,112 | 2/1961 | Young . |
| 3,132,827 | 5/1965 | Frost . |
| 3,227,296 | 1/1966 | Marks .................................... 182/2 |
| 3,250,343 | 5/1966 | Maloney . |
| 3,255,845 | 6/1966 | Gardner . |
| 3,285,365 | 11/1966 | Longton . |
| 3,311,192 | 3/1967 | Richey . |
| 3,329,290 | 7/1967 | Lowery . |
| 3,337,000 | 8/1967 | Giladi . |
| 3,413,787 | 12/1968 | van Antnerp et al. ............. 56/328.1 |
| 3,452,528 | 7/1969 | Fairchild et al. . |
| 3,523,404 | 8/1970 | Girardi ............................... 56/328.1 |
| 3,534,832 | 10/1970 | Pediske . |
| 3,866,713 | 2/1975 | Carpenter et al. . |
| 3,878,957 | 4/1975 | Rempel . |
| 4,258,825 | 3/1981 | Collins . |

Primary Examiner—Bruce M. Kisliuk
Attorney, Agent, or Firm—Dominik, Stein, Saccocio, Reese, Colitz and Van Der Wall

[57] ABSTRACT

A fruit harvesting machine comprising a pair of vertically disposed booms which are pivotally connected at their lower ends to opposing ends of a transverse extensible axle rigidly connected to the underside of a transport mechanism such as a conventional tractor. A pair of man supporting baskets are reciprocatably mounted to each boom. A trough is positioned at each basket allowing picked fruit to be conveyed via a conveying tube into a storage bin at the rear of the tractor. The fruit harvesting machine is particularly adapted for harvesting fruit from hedged rows of fruit trees and the like.

10 Claims, 9 Drawing Sheets

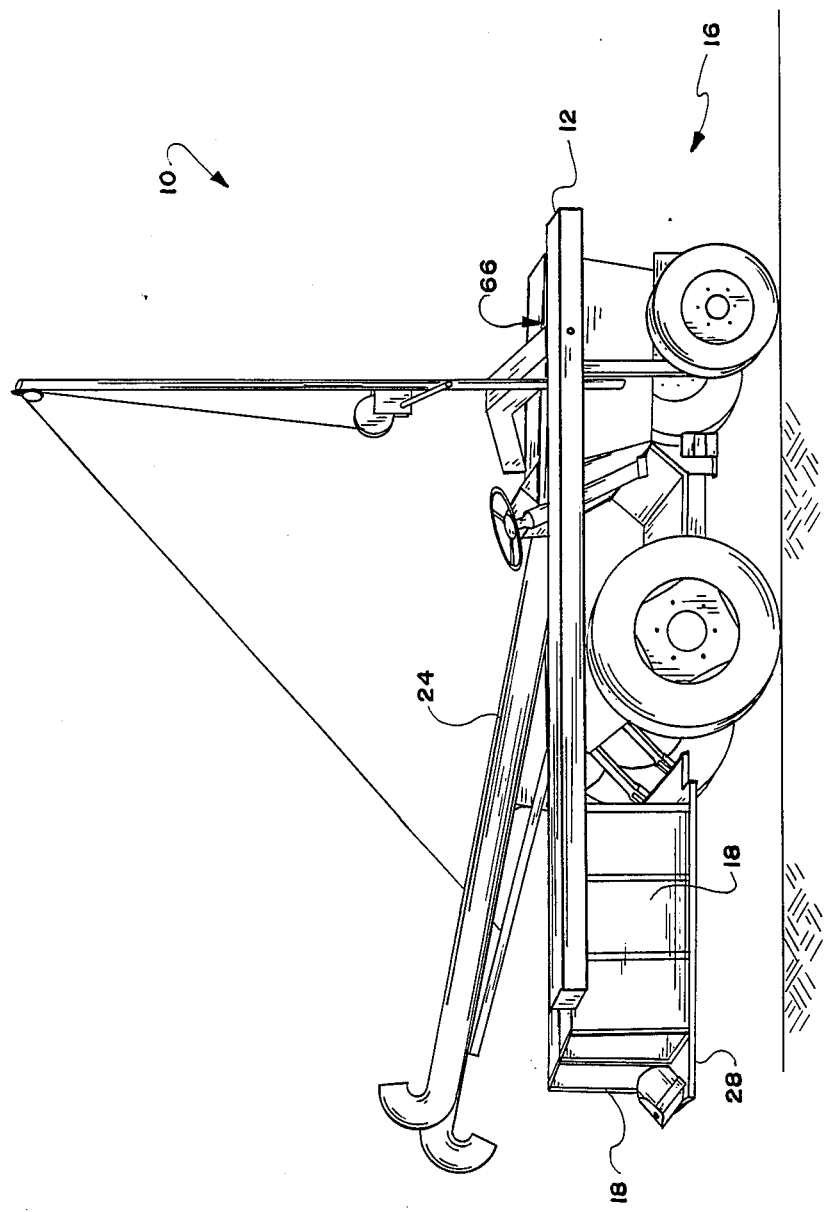

FRUIT HARVESTING MACHINE

BACKGROUND OF THE INVENTION

1. Field of the Invention

This invention relates to harvesting machines. More particularly, this invention relates to fruit harvesting machines including a man supporting bucket connected to a tiltable boom which allows a person situated in the bucket to pick fruit from the fruit bearing trees.

2. Description of the Background Art

Presently, there exist many types of fruit harvesting machines. Typical fruit machines include a man supporting basket operatively connected to the end of an articulated boom powered by a transport vehicle. During use, the person/picker situated in the basket controls the movement of the boom so as to position himself adjacent to the tree whose fruit is to be picked. U.S. Pat. Nos. 2,973,112, 3,878,957, 3,337,000, 3,182,827, 2,450,152, 3,329,290, 3,250,343, 3,866,713 and 3,285,365 illustrates prior art harvesting machines. Several of these patents disclose dual boom arrangements allowing fruit to be picked from adjacent rows of trees as the fruit harvesting machine is transported therebetween. For example, U.S. Pat. No. 3,285,365 discloses man supporting baskets connected to respective booms emanating from a common, vertically reciprocatable carriage such that the baskets are moved upwardly or downwardly in unison.

U.S. Pat. Nos. 3,452,528 and 3,311,192 disclose more elaborate fruit harvesting machines in which the boom is operatively connected to swiveling mechanisms allowing the boom and correspondingly, the man supporting basket, to move circuitously around at least a portion of the fruit tree being picked.

With regard to oranges and similar fruits, modern day horticulture suggests that a greater yield per acre can be achieved by planting the trees closer together in a row instead of spaced apart such as shown in U.S. Pat. No. 3,866,713. The adjacent positioning of the trees in a row allows the row of trees to be hedged along the side and along the top, much in the same manner as trimming a row of ornamental ligustrum hedges. Oftentimes, the hedged row of trees are trimmed from the bottom at a slight inward angle and from the top at a slight downward angle as opposed to perfectly vertical sides and horizontal top.

The proliferation of hedged row fruit trees has rendered many of the prior art fruit harvesting machines obsolete or excessively complicated and expensive.

Therefore, it is an object of this invention to provide an apparatus which overcomes the aforementioned inadequacies of the prior art devices and provides an improvement which is a significant contribution to the advancement of the fruit harvesting art.

Another object of this invention is to provide a fruit harvesting machine particularly designed for harvesting a hedged row of fruit trees.

Another object of this invention is to provide a hedged row harvesting machine which allows harvesting of adjacent hedged rows of fruit trees as the harvesting machine is transported therebetween.

Another object of this invention is to provide a hedged row harvesting machine including a pair of vertical booms positioned on opposing sides of a tractor to which are connected a plurality of vertically reciprocatable man supporting baskets allowing a person situated in each of the baskets to pick adjacent sides of adjacent hedged rows of fruit trees.

Another object of this invention is to provide a hedged row harvesting machine including vertical basket supporting booms which may be tilted outwardly from a bottom pivot point connected to the frame of the basket so as to be parallel and adjacent to the sides of the hedged row of fruit trees.

Another object of this invention is to provide a hedged row harvesting machine including vertical basket supporting booms which may be adjusted outwardly at their bottom pivot point so as to increase or decrease the distance between the booms corresponding to the distance between adjacent hedged rows of fruit trees.

Another object of this invention is to provide a hedged row harvesting machine including a pair of basket supporting booms and having a fruit conveying tube having one end conveniently positioned at each basket and its other end positioned over a fruit bin seated on the rear of the tractor.

Another object of this invention is to provide a hedged row harvesting machine which is operable by means of controls positioned in the man supporting baskets.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a fruit harvesting machine particularly adapted for harvesting fruit from hedged rows of fruit trees and the like. More particularly, the hedged row harvesting machine of the invention comprises a pair of vertically disposed booms which are pivotably connected at their lower ends to opposing ends of a transverse axle rigidly connected to the underside of a transport mechanism such as a conventional tractor. A cross beam is positioned over the engine of the tractor and rigidly connected to the frame by vertical support members. The middle portion of each boom is pivotably connected to a dual action hydraulic cylinder positioned in opposing ends of the cross beam allowing precise outward tilting of the booms about their lower pivot point so as to correspond to the sides of the hedged rows. Outriggers are provided on each side of the tractor to prevent over-turning. Further, the axle may be extensible so as to allow adjustment of the spaced distance between the booms to correspond to the distance between the hedged rows.

A pair of man supporting baskets are reciprocatably mounted via travellers to the front and rear sides of each boom. In one embodiment, a conveying tube is interconnected between troughs positioned at each basket and the rear of the tractor allowing picked fruit to be deposited in the trough. The fruit is then conveyed through the tube into a fruit bin positioned on the rear of the tractor. In another embodiment, a temporary storage bin is affixed to the front and side of each basket. The temporary storage bin includes a door mechanism at its bottom end which, when opened, acts as a guide to empty the fruit in the bin into a chute positioned longitudinally above the tractor which then causes the fruit to roll rearwardly into the fruit bin at the rear of the tractor.

Each boom may further comprise a pair of light fixtures to facilitate picking during night. Also, each traveller may be easily adapted to allow mounting of baskets in tandem. Finally, controls are positioned in each basket for controlling the upward and downward movement of the basket along their respective boom and the tilting of the boom. Controls are also positioned in one basket for controlling the steering and forward speed for the tractor.

During use, the tractor is set on a course down the middle of the path between the adjacent rows of hedged fruit trees to be picked. The controls in one of the baskets allow the pickers situated therein to increase or decrease the speed of the tractor as desired and to steer the tractor. Other controls in each basket control the outward tilting of the respective boom allowing the boom to follow the contour of the side of the hedged row being picked. Other controls in each basket allow the picker situated therein to control the upward and downward movement of the basket, preferably but not necessarily in reciprocal relationship with the other basket connected to the same boom. As the fruit is picked by the picker, it is deposited in the trough at the upper edge of the basket whereupon the fruit flows through the conveying tube into the fruit storage bin at the rear of the tractor. In the other embodiment, the fruit is temporarily stored in the temporary storage bin. When full, the operator actuates the door mechanism to empty the bin whereupon the fruit flows rearwardly along the chute into the fruit bin.

It is apparent that the hedged row harvesting machine is particularly adapted for harvesting hedged rows of fruit trees such as orange trees. The versatile controls of the machine allow the pickers to optimally position their respective baskets relative to the sides of the hedged rows and optimally control the upward and downward movement of the baskets as needed depending upon the density of the fruit being picked at various areas along the side and top of the hedged rows.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 11 is a side view of the hedged row harvesting machine of the invention illustrating the booms in a knocked-down position with the baskets stacked on the fruit bin platform, allowing convenient transportation to and from the grove.

Similar reference characters refer to similar parts throughout the several views of the drawings.

DETAILED DESCRIPTION OF THE PREFERRED EMBODIMENT

Figure 1:
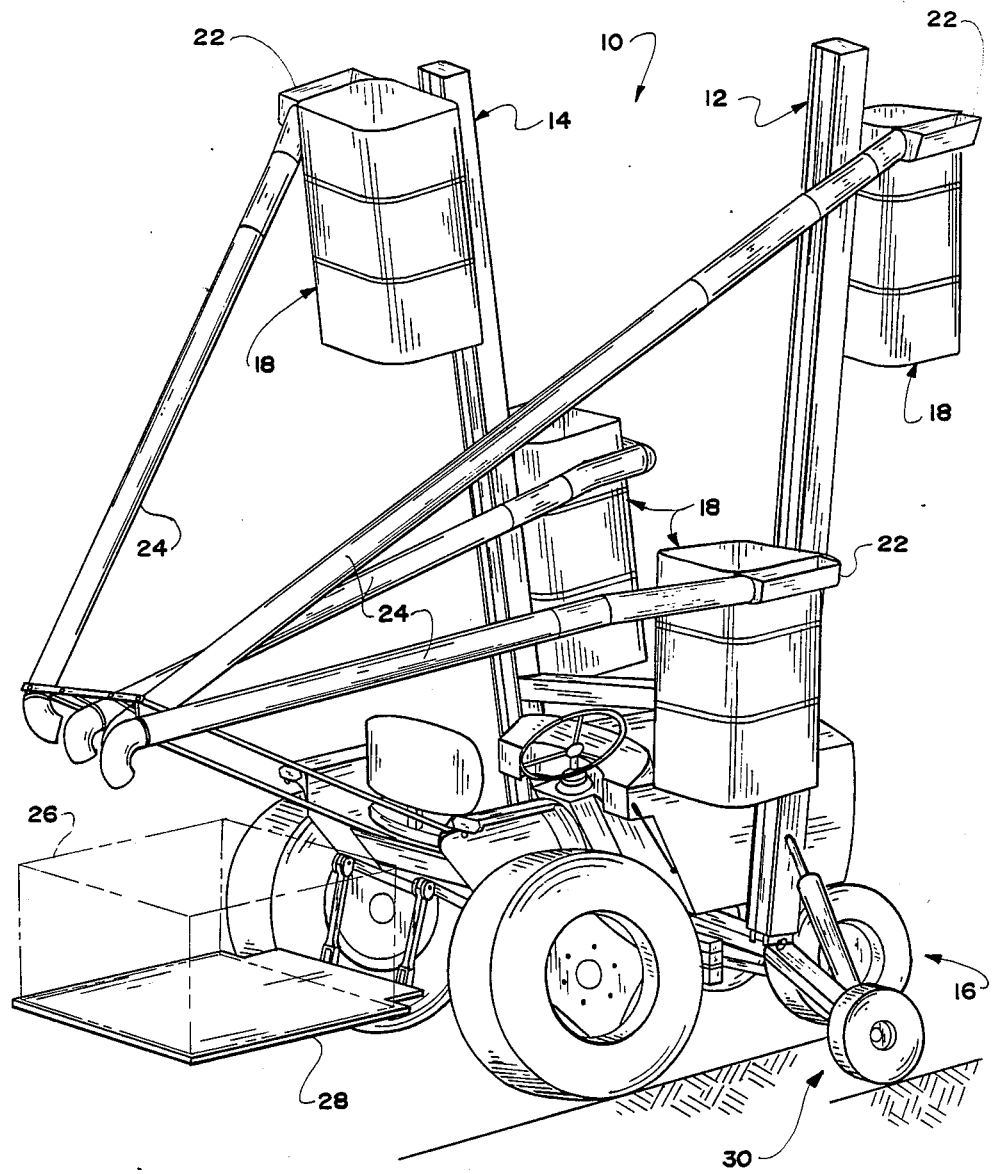
FIG. 1 is a perspective view of the hedged row fruit harvesting machine of the invention illustrating the vertical booms emanating from opposing sides of the tractor with a pair of man supporting baskets reciprocatably mounted to each boom allowing pickers situated therein to pick fruit from the trees and deposit the fruit into a trough adjacent to the basket for flowing into a fruit bin via a conveying tube.

Referring to FIG. 1, the fruit harvesting machine 10 of the invention comprises a pair of vertically disposed booms 12 and 14 operatively connected to opposing sides of a conventional tractor, generally indicated by numeral 16, so as to pivot outwardly from the tractor 16. A pair of man supporting baskets 18 are slideably connected via travellers 20 to the front and rear sides of each boom 12 and 14 to move upwardly or downwardly by means of a lift mechanisms 21 inside each boom 12 and 14 (see FIGS. 5-10). An outrigger, generally indicated by numeral 30, extends from opposing sides of the tractor 16 to prevent sidewise capsizing of the tractor 16 when the respective boom 12 or 14 is tilted outwardly.

Figure 1A:
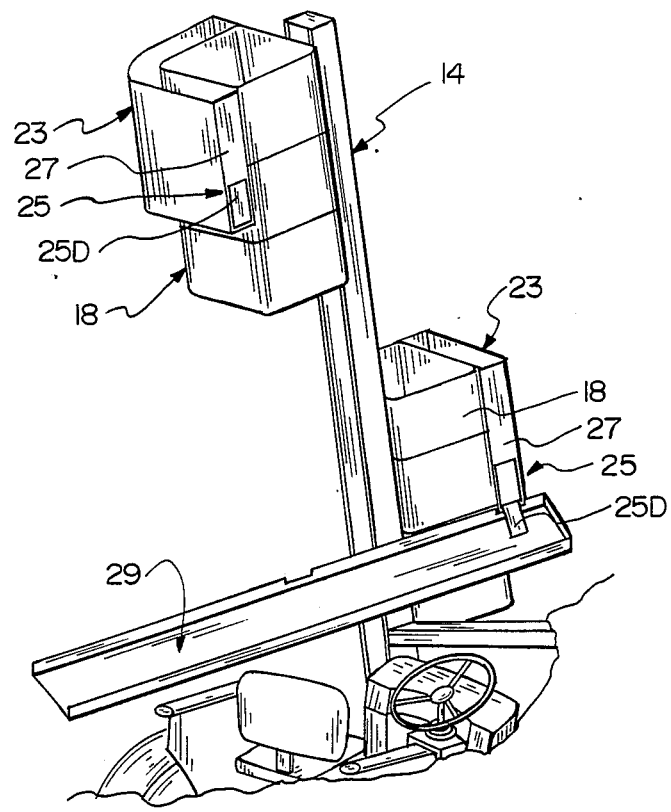
FIG. 1a is a partial perspective view of the harvesting machine illustrating another embodiment for conveying the picked fruit into the fruit bin as including a temporary storage bin affixed to each basket which empties into a chute.

In one embodiment, a trough 22 is rigidly affixed to an upper edge of each basket 18. A fruit conveying telescopic tube 24 is pivotably connected to each trough 22 and positioned t extend rearwardly of the tractor 16 above a fruit bin 26 removably positioned on a fruit bin platform 28 supported at the rear of the tractor 16. As shown in FIG. 1a, in another embodiment, an L-shaped wrap around, temporary storage bin 23 is affixed to the front and the side opposite the traveller 20 of each basket 18. The temporary storage bin 23 includes a door mechanism 25 positioned in the innermost panel 27 facing a chute 29 positioned longitudinally over the tractor 16 and extending over the fruit bin platform 28. Picked fruit is deposited into the temporary storage bin 23 and when full, the lift mechanism 21 is operated to align the door mechanism 25 with chute 29. The door mechanism 25 is then operated to open the door 25D. The opened door 25D functions as a guide to guide the fruit into the chute 29 as the temporary storage bin 23 empties. Door 25D is then closed.

Figure 2:
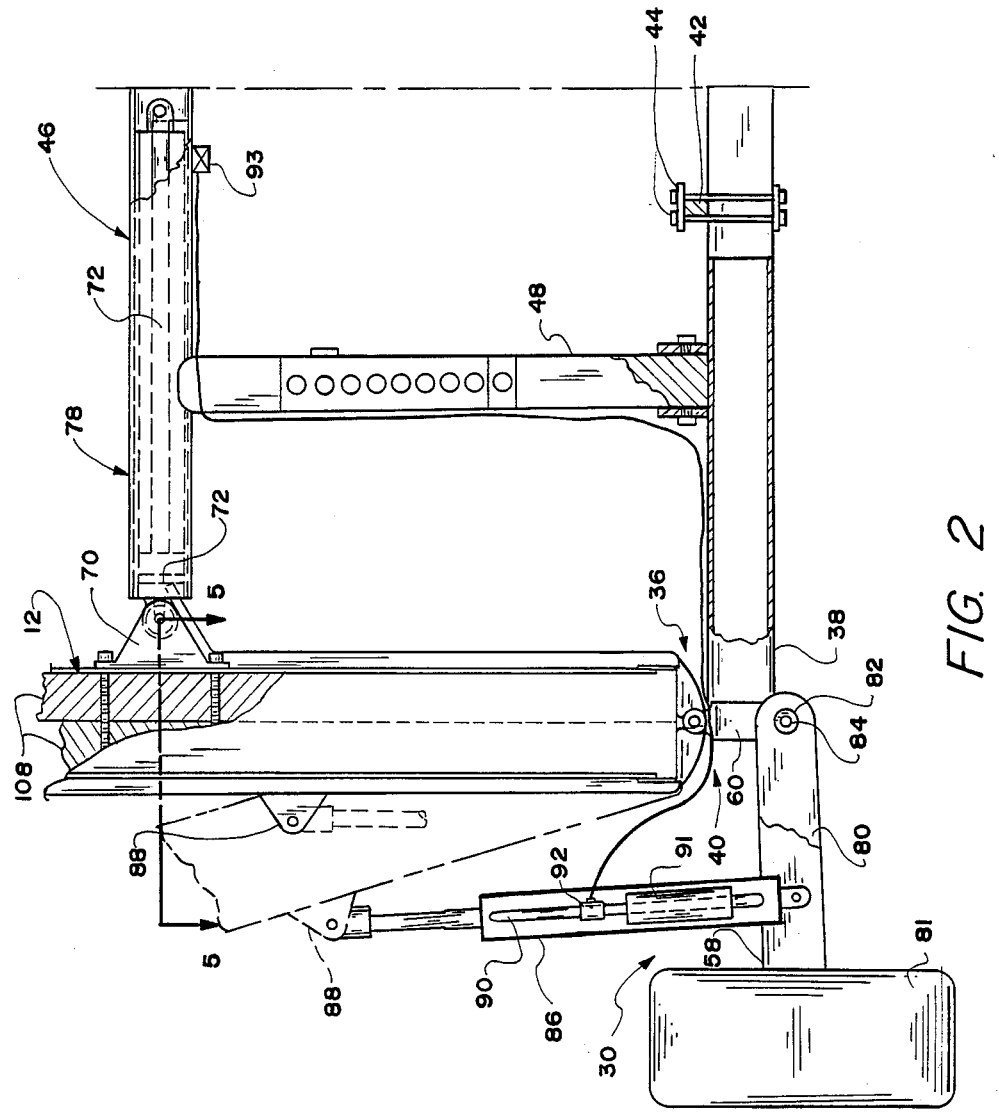
FIG. 2 is a partial view of the right (starboard) boom illustrating the manner in which it is supported at its bottom end by an extensible axle via a universal joint and at its middle portion by a cross member containing a dual action hydraulic cylinder and further illustrating an outrigger mechanism connected the extensible axle to provide added stability to the tractor when the boom is tilted outwardly.

Referring now to FIG. 2, each boom 12 is pivotably connected at its lower end 36 to a transverse extensible axle 38 by means of a universal joint, generally indicated by numeral 40. The extensible axle 38 is rigidly connected to the undercarriage 42 of the tractor 16 by bolts 44 or the like such that the opposing ends of the extensible axle extends outwardly from the opposing sides of the tractor 16.

A cross member 46 is positioned above the engine of the tractor 16 in a position substantially transverse to the direction of travel of the tractor 16. The cross member 46 is rigidly connected to the extensible axle 38 by means of vertical support members 48 positioned on opposing sides of the tractor 16.

Figure 3B:
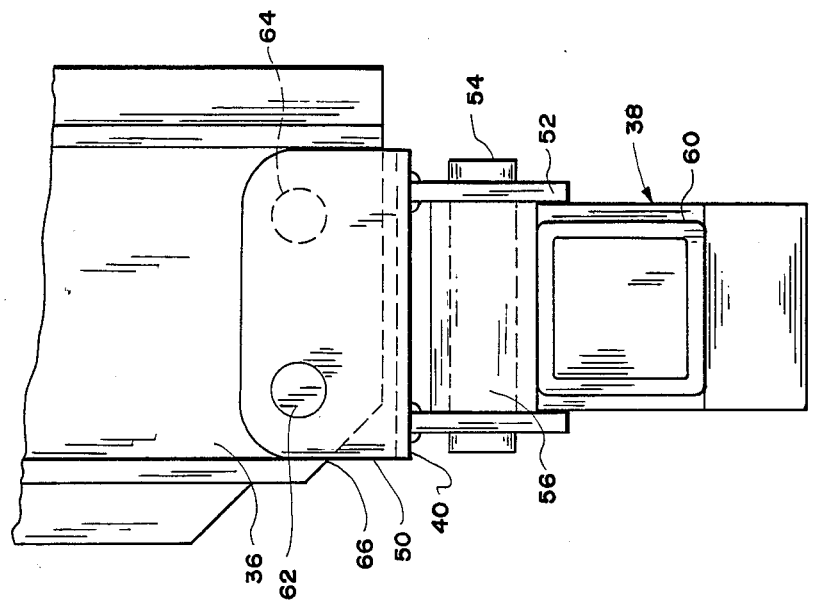
FIGS. 3A and 3B are enlarged front and end views of the universal joint interconnecting the bottom end of the boom with the extensible axle.
Figure 3A:
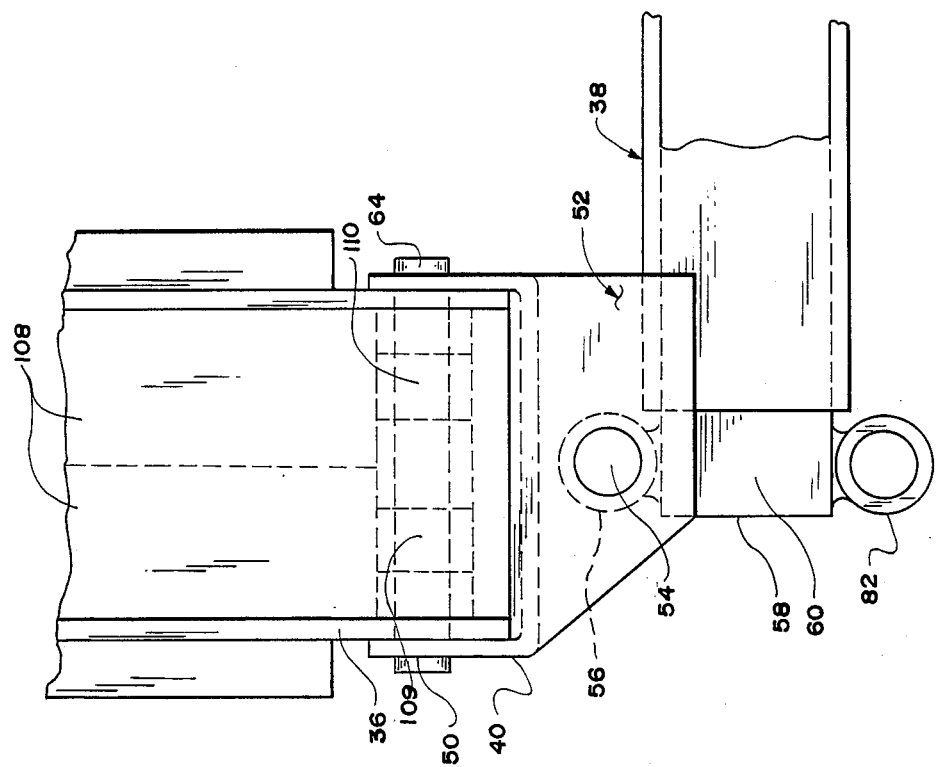

As shown in FIGS. 3A and 3B, the universal joint 40 comprises an upper clevis 50 positioned transverse to a lower clevis 52. The lower clevis 52 includes a pivot pin 54 inserted through bearing 56 welded to the end 58 of the telescopic extensible member 60 of the extensible axle 38. Thus, the lower clevis 52 allows the boom 12 and 14 to tilt outwardly and inwardly about pivot pin 54.

The upper clevis 50 of the universal joint 40 comprises a pair of pivot pins 62 and 64 which are inserted through corresponding holes at the end 36 of the respective booms 12 and 14. When both inserted, the pivot pins 62 and 64 secure the booms 12 and 14 in an upright position without forward or backward movement. Removal of pivot pin 64 allows the boom 12 or 14 to pivot rearwardly about chambered edge 66 to a horizontally angled position for storage (see FIG. 11).

Figure 3C:
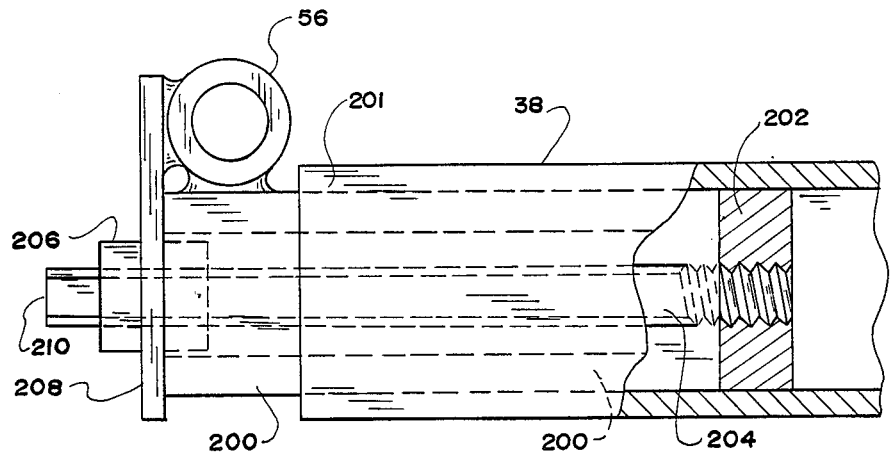
FIG. 3C is a side view, partially cut-away, illustrating another embodiment of the extensible axle.

FIG. 3C is a partially cut-away view of another embodiment of the extensible axle 38. More particularly, this embodiment of extensible axle 38 comprises a cylindrical pipe 200 which is telescopically slideably inserted within the rectangular frame 201 of the extensible axle 38. A threaded plug 202 is rigidly connected within the extensible axle 38. A length of threaded rod 204 is positioned within the cylindrical pipe 200 to threadably engage the threaded plug 202. The threaded rod 204 also threadably engages a thrust collar 206 which is rotatably mounted to a plate 208 welded to the end of the cylindrical pipe 200. The end 210 of the threaded rod 204 is made square allowing it to be rotated by a wrench or other suitable tool. Clockwise rotation of the threaded rod 204 forces the pipe 200 into the extensible axle 38. Conversely, counter clockwise rotation of rod 204 forces the pipe 200 outwardly, thereby extending the overall length of the axle 38.

Figure 4:
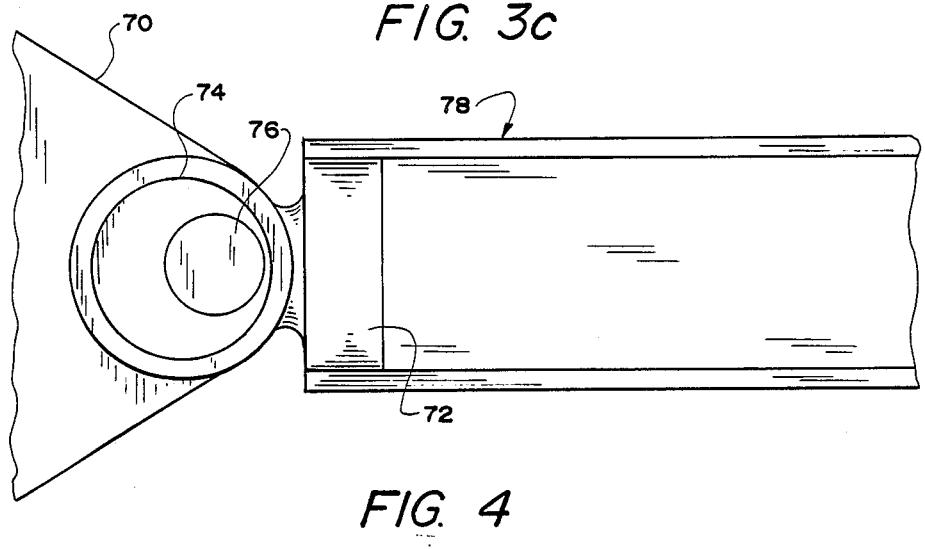
FIG. 4 is an enlarged view of the boom clevis providing eccentric interconnection between the boom and the rod of the dual acting hydraulic cylinder controlling the tilting of the boom.

Referring again to FIG. 2 along with FIG. 4, the boom 12 and 14 is pivotably connected to the cross member 46 by means of a cross member clevis 70 rigidly connected to the inward side of the boom 12 or 14. The cross member 46 includes a dual acting hydraulic cylinder 78 having its extensible rod 72 with clevis 72 clevis 70 extending outwardly therefrom. An enlarged hole 74 is formed within clevis 70 to receive the smaller diameter pivot pin 76 of the extensible rod clevis 72. The eccentricity of the pivot pin 76 within hole 74 allows sufficient room for movement of the pin 76 within hole 74 as the boom 12 or 14 is tilted outwardly about its lower end 36 by extension of the dual acting cylinder 78.

Still referring to FIG. 2, each outrigger 30 positioned on opposing sides of the tractor 16 comprises a stub axle 80 with wheel 81 pivotably connected to the end 58 of the extensible portion 60 of the extensible axle 38 by means of a journal bearing 82 welded thereto and pivot pin 84. Each outrigger 30 further comprises a hydraulic cylinder 86 interconnected between a mid portion of the stub axle 80 and to a clevis 88 welded to the outer side of the respective boom 12 or 14.

Hydraulic cylinder 86 of the outrigger 30 functions to prevent pivoting of the outrigger about pivot pin 84 when the respective boom 12 or 14 is being tilted or when the respective boom 12 or 14 has been tilted beyond a predetermined safe limit. More particularly, both hydraulic inputs of the cylinder 86 are connected via line 90 to a reservoir 91. The reservoir 91 is provided to accommodate the volume differential in the opposite ends of the cylinder 86 and allow free flow of fluid between the cylinder ends. A solenoid valve 92 is connected inline with hydraulic line 90. When closed, solenoid valve 92 prevents flow through the line 90 thereby freezing the operation of the cylinder 86. Outrigger 30 is thus secured in a rigid position. The solenoid valve 92 is controlled by a pressure switch and relay 93 connected to the dual acting cylinder 78. The pressure switch 93 energizes the solenoid valve 92 when the pressure exceeds a predetermined amount, which pressure is a function of the angle of tilt of the respective boom 12 or 14. The relay 93 energizes the solenoid valve 92 when it senses tilting movement of the respective boom.

Figure 6:
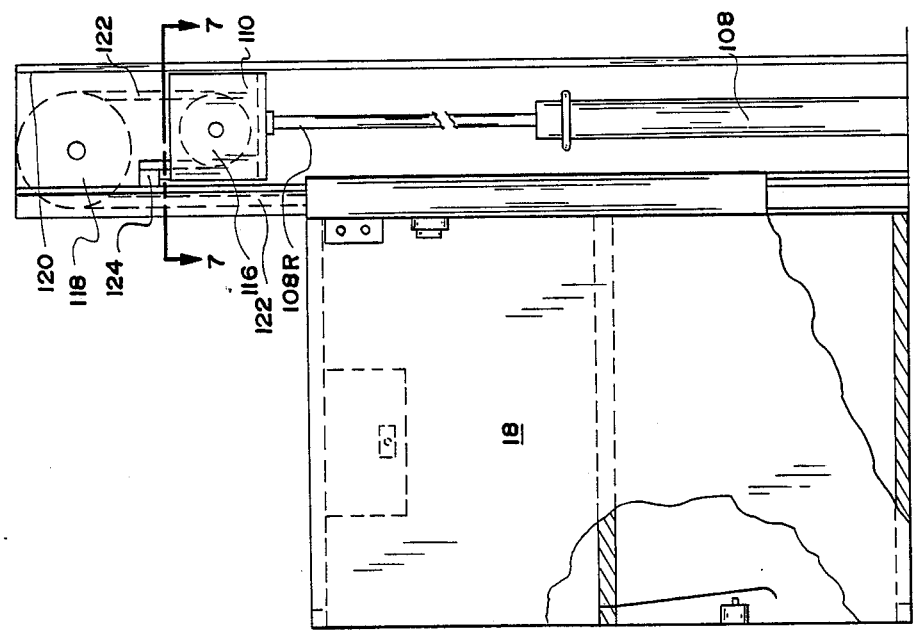
FIG. 6 is a partial view of the upper portion of one of the booms illustrating the basket connected to the traveler and illustrating the cable, sheaves and clevis which interconnect the traveler with the respective hydraulic cylinder causing the basket to move upwardly or downwardly, and further illustrating the knee and hip controls in the basket allowing convenient operation by the picker.
Figure 5:
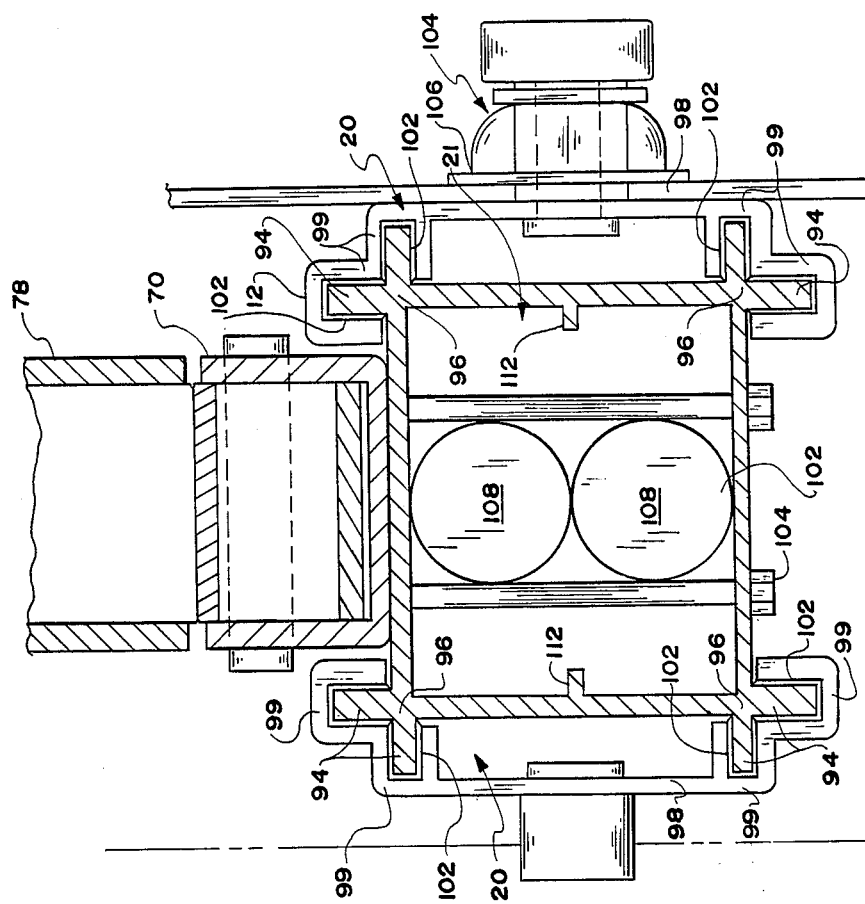
FIG. 5 is a cross sectional view of FIG. 2 along lines 5—5 illustrating the preferred cross-sectional configuration of the boom and the travelers which slideably move along the length of the boom and to which the baskets are connected and further illustrating the preferred embodiment of the lifting mechanism as including a pair of lift cylinders positioned within the boom for raising and lowering the respective baskets via a clevis end cable.
Figure 7:
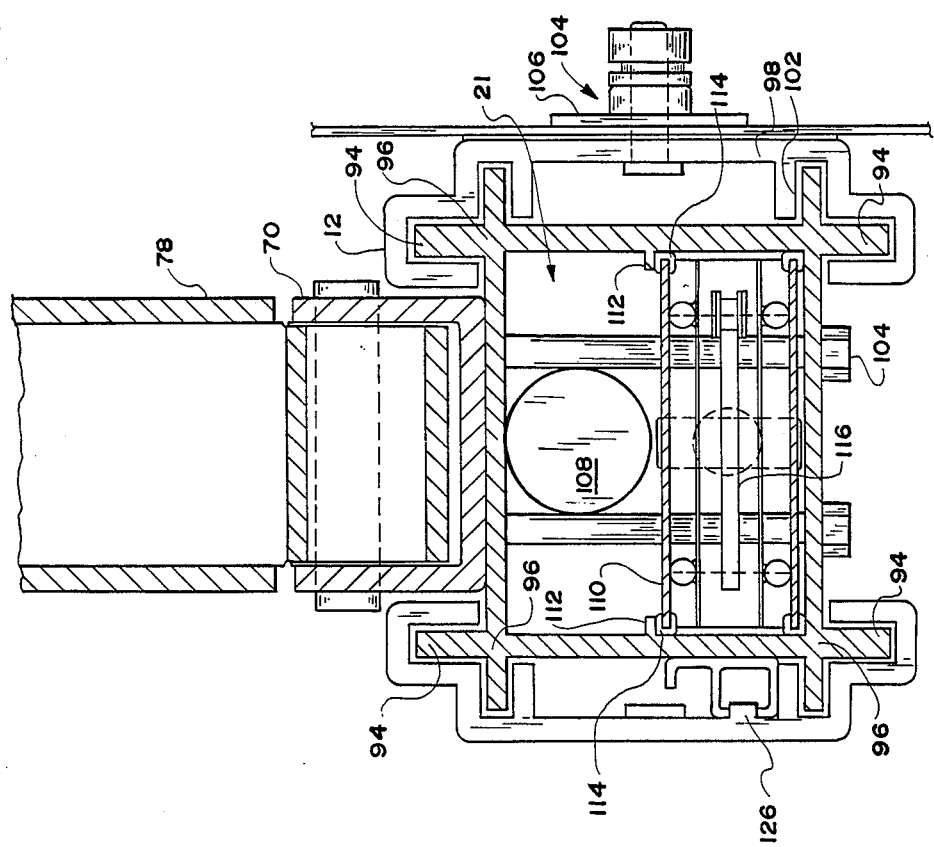
FIG. 7 is a cross-sectional view of FIG. 6 along lines 7—7 illustrating the positioning of the lift cylinder clevis within the boom.

The preferred embodiment of the cross-sectional configuration of the booms 12 and 14 and the preferred embodiment for the lifting mechanism 21 are shown in FIGS. 5–7. More particularly, the preferred embodiment of each boom 14 and 16 comprises a generally rectangular configuration having outwardly extending ends 94 at each corner 96 of the rectangular configuration. The travellers 20 each comprise a flat portion 98 having inwardly disposed U-shaped corner portions 99 positioned at ninety degrees relative to each other corresponding to the cross-sectional configuration of the ends 94 extending from the corners 96 of the boom 12 and 14. A bearing material 102 is positioned within each of the U-shaped corner portions 100 to provide a suitable bearing surface against the outer surfaces of the ends 94 of the corners 96 of the boom 12 and 14 as the traveller 20 slides along its length. It is noted that the baskets 18 are pivotably connected to the flat portion 98 of the traveller 20 by means of a locking bolt and nut 104 and friction plate 106 which allows the basket 18 to swing freely about bolt 104 or rigidly secured to the flat portion 98 of the traveller 20.

The preferred embodiment of the lifting mechanism 21 comprises a pair of hydraulic cylinders 108 positioned within each boom 12 and 14. The lowermost end of each hydraulic cylinder 108 is connected via eye 109 to the pivot pin 62 and 64 of the universal joint 40 (see FIGS. 3A, 3B & 3C). The extensible rod 108R of the hydraulic cylinders are each connected to a respective lifting clevis 110 reciprocatably mounted within boom 12 or 14 and centered by means of clevis guide 112. A suitable bearing material 114 such as nylatron may be provided at the outermost edges of the clevis 112 to facilitate sliding. Each lifting clevis 110 includes a sheave 116 rotatably positioned therein. A corresponding sheave 118 is positioned at the upper end 120 of the boom 12 or 14. A cable 122 is rigidly connected at one end to the inner surface of the boom 12 or 14 at fastener 124 and is threaded through the sheave 116 in the clevis 110 and then through the upper sheave 118 to then run along the outside of the boom 12 or 14 to be rigidly fastened to the inner surface of the respective traveller 20 by means of fastener 126.

During use, extension of the rod 108R of the hydraulic cylinder 108 causes the lifting clevis 110 to move upwardly to play out a longer length of cable 122 causing the traveller 20 to which it is connected and the corresponding basket 18 to be lowered Conversely, contraction of the rod 108R causes the lifting clevis 110 to move downwardly within boom 12 or 14 thereby raising the traveller 20 and basket 18. The use of two hydraulic cylinders 108 allows each basket 18 on each boom 12 or 14 to be individually raised or lowered.

Figure 8:
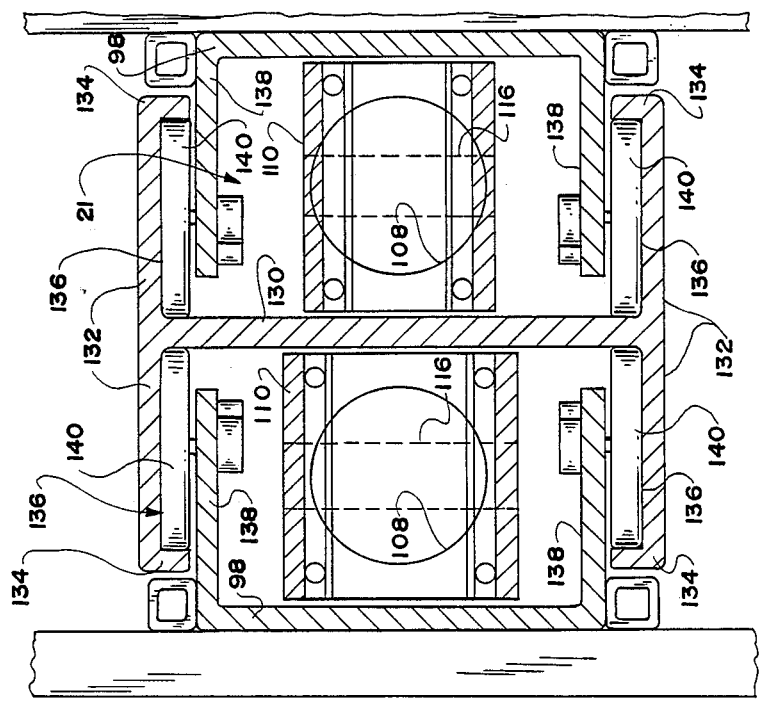
FIG. 8 illustrates another cross-sectional embodiment of the boom.

FIG. 8 illustrates another cross-sectional embodiment of the booms 12 and 14 as including a generally I-shaped configuration having center member 130 and side members 132 with longitudinally inturned edges 134. The distance between the inturned edges 134 and the center member 130 define a track 136 along the longitudinal length of the boom 12 or 14. Correspondingly, traveller 20 comprises a flat portion 98 (to which the basket 18 is connected as described above) and inwardly disposed side edges 138 defining a generally U-shaped configuration. A plurality of wheel bearings 140 are journaled to the side edges 138 along its length to ride within track 136. Slideable movement along the length of the boom 12 or 14 is therefore achieved.

Figure 9:
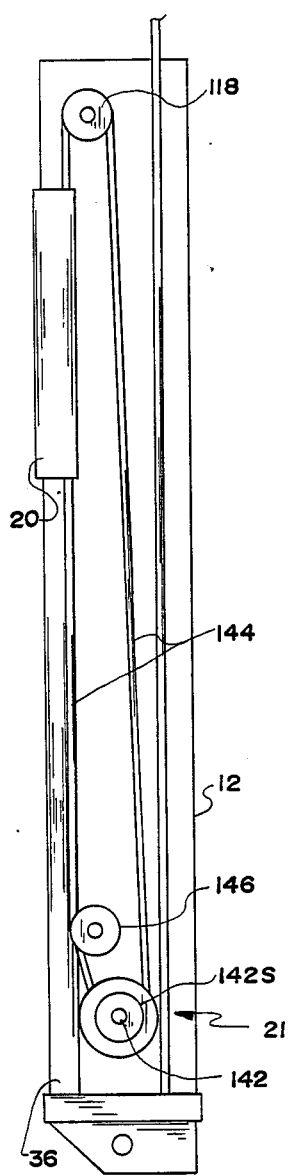
FIG. 9 illustrates another lifting mechanism as including an endless chain to which the traveler of the basket is connected and which is powered by a hydraulic motor.
Figure 10:
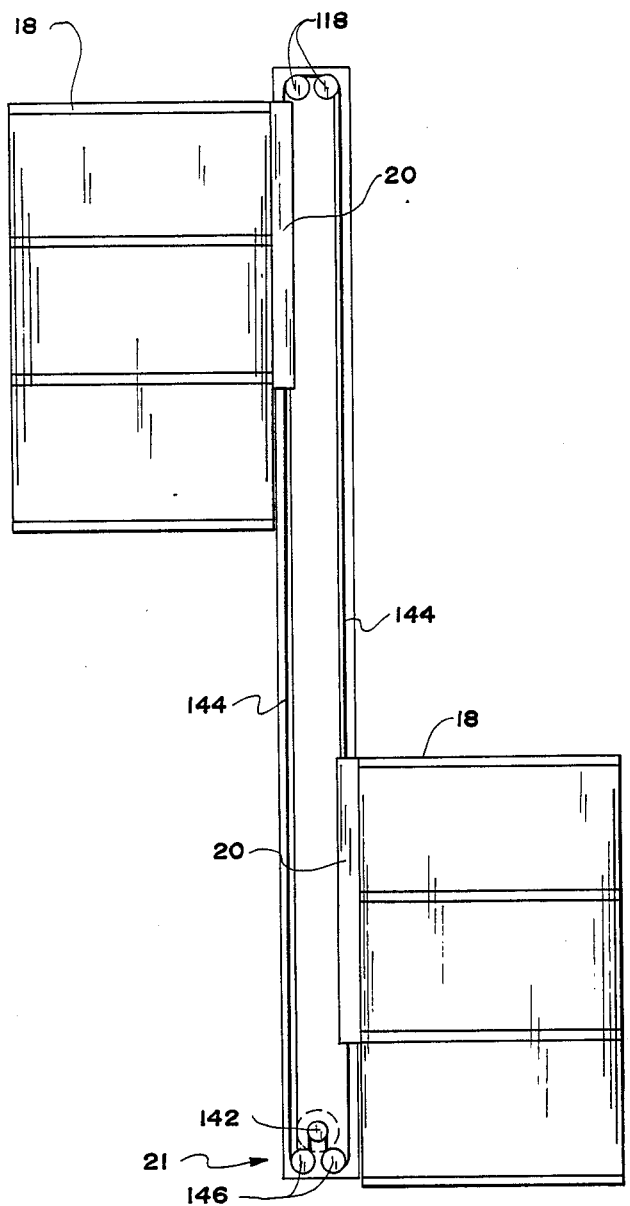
FIG. 10 illustrates still another lifting mechanism as including an endless chain to which both travelers of both baskets are connected so that the baskets are raised or lowered in opposite directions simultaneously.

FIGS. 9 and 10 include other embodiments of the lifting mechanism 21 by means of hydraulic motors 142 in lieu of the hydraulic cylinders 108. Specifically, as shown in FIG. 9, the hydraulic motor 142 is positioned at the lower end 36 of the boom 12 and 14. An endless chain 144 is entrained between the upper sheave 118 and the sheave 142S of the hydraulic motor 142. The traveller 20 is rigidly connected to the endless chain 144. An idler sheave 146 may be provided for adjusting the tension in the chain 144. Operation of the hydraulic motor 142 causes rotation of the endless chain 144 to raise and lower the traveller 20 and basket 18.

FIG. 10 illustrates a modified hydraulic motor type of lifting mechanism including a single hydraulic motor 142 and a single endless chain 144 which is entrained about the upper sheaves 118 and the lower idler sheaves 146 of both sides of the respective boom 12 and 14 such that the paired travellers 20 and baskets 18 are moved upwardly or downwardly in reverse unison.

Finally, FIG. 11 illustrates the hedged row harvesting machine of the invention with its booms 12 and 14 in a knocked-down position (by removal of pivot pins 62 and 64 and pivoting a rod 72 of cylinder 78) with the baskets 18 stacked on the fruit box platform 28, allowing convenient transportation to and from the grove.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A fruit harvesting machine for harvesting fruit from fruit trees, comprising in combination:
   a transport mechanism;
   an axle connected transversely to a lower portion of said transport mechanism;
   a cross beam connected transversely to an upper portion of said transport mechanism, said cross beam including a pair of extensible members extending from both ends thereof;
   a pair of booms positioned on opposing sides of said transport mechanism;
   first means for pivotably connecting a lower end of each said booms to respective ends of said axle;
   second means for pivotably connecting an end of said extensible members of said extensible member to a middle portion of respective said booms, whereby, extension of said extensible member causes tilting of said boom about said first pivot means;
   at least one man supporting basket slideably mounted to each said boom; and
   means for lifting said basket along the respective said boom.

2. The fruit harvesting machine as set forth in claim 1, wherein said axle is extensible.

3. The fruit harvesting machine as set forth in claim 1, further including tilt controls positioned within at least one said basket for controlling extension of respective said extensible members thereby controlling the tilting of respective said booms.

4. The fruit harvesting machine as set forth in claim 1, further including transport mechanism controls positioned in at least one of said baskets for controlling forward movement of said transport mechanism.

5. The fruit harvesting machine as set forth in claim 1, further including lift controls positioned within each said basket for controlling movement of said baskets on the respective said boom.

6. The fruit harvesting machine as set forth in claim 1, wherein at least two of said baskets are slideably mounted on each said boom and wherein said lifting means includes means for lifting each said basket independently of the others.

7. The fruit harvesting machine as set forth in claim 1, further including a conveying tube or trough interconnecting each said basket with a fruit bin transported by said transport mechanism allowing picked fruit to be transported from said baskets to said storage bin.

8. The fruit harvesting machine as set forth in claim 1, further including a temporary storage bin affixed to each said basket and a chute affixed to said transport mechanism such that picked fruit is deposited into said temporary storage bin and when necessary, the accumulated picked fruit is emptied into said chute to flow into a fruit bin transported by said transport mechanism.

9. The fruit harvesting machine as set forth in claim 1, further including wheeled outriggers pivotably connected to opposing ends of said axle.

10. The fruit harvesting machine as set forth in claim 9, wherein said outriggers are pivotably connected to opposing ends of said axles and include means for restraining pivoting when the respective said boom is tilted outwardly.

* * * * *